US009718140B2

(12) United States Patent
Onodera et al.

(10) Patent No.: US 9,718,140 B2
(45) Date of Patent: Aug. 1, 2017

(54) ELECTRIC DISCHARGE MACHINING SYSTEM

(71) Applicants: Yasuo Onodera, Tokyo (JP); Hiroki Hikosaka, Tokyo (JP); Kazunari Morita, Tokyo (JP); Hidetaka Katougi, Tokyo (JP)

(72) Inventors: Yasuo Onodera, Tokyo (JP); Hiroki Hikosaka, Tokyo (JP); Kazunari Morita, Tokyo (JP); Hidetaka Katougi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/439,598

(22) PCT Filed: Dec. 6, 2012

(86) PCT No.: PCT/JP2012/007819
§ 371 (c)(1),
(2) Date: Apr. 29, 2015

(87) PCT Pub. No.: WO2014/087457
PCT Pub. Date: Jun. 12, 2014

(65) Prior Publication Data
US 2015/0283635 A1  Oct. 8, 2015

(51) Int. Cl.
*B23H 1/00* (2006.01)
*B23H 1/02* (2006.01)

(52) U.S. Cl.
CPC .................. *B23H 1/024* (2013.01)

(58) Field of Classification Search
CPC ............. B23H 1/02; B23H 7/04; B23H 1/024
(Continued)

(56) References Cited

U.S. PATENT DOCUMENTS 4,800,248 A * 1/1989 Futamura ............... B23H 1/022
219/69.18
5,756,956 A * 5/1998 Sato ......................... B23H 7/04
219/69.12
(Continued)

FOREIGN PATENT DOCUMENTS

EP        0665078      *  8/1995
JP     56-163835 A       12/1981
(Continued)

OTHER PUBLICATIONS

Notification for Reasons for Refusal for Corresponding JP 2013-540559 dated Oct. 21, 2013.
(Continued)

*Primary Examiner* — Quang D Thanh
*Assistant Examiner* — Joseph Iskra
(74) *Attorney, Agent, or Firm* — Sughrue Mion, PLLC; Richard C. Turner

(57) ABSTRACT

An electric discharge machining system is provided which distinguishes an abnormal discharge caused by an immediate discharge and an abnormal discharge caused not by the immediate discharge to suitably control in each case. The electric discharge machining system according to the present invention that machines a workpiece by producing a discharge between an electrode and the workpiece, includes: a no-load-time detection means that detects no-load time of inter-electrode voltage between the electrode and the workpiece; an immediate-discharge determination means that compares the no-load time detected by the no-load-time detection means with predetermined time to determine whether or not the discharge is an immediate discharge; a voltage detection means that detects the inter-electrode voltage; an abnormal-discharge determination means that compares the voltage detected by the voltage detection means with a predetermined value to determine whether or
(Continued)

not the discharge is a normal discharge; a discharge state assessment means that assesses a state of the discharge on the basis of the determination result of the immediate-discharge determination means and the determination result of the abnormal-discharge determination means; and a machining condition control means that controls a machining condition on the basis of the discharge state assessed by the discharge state assessment means.

13 Claims, 8 Drawing Sheets

(58) Field of Classification Search
USPC .............. 219/69.11, 69.13, 69.15, 69.2
See application file for complete search history.

(56) References Cited

U.S. PATENT DOCUMENTS

| | | | |
|---|---|---|---|
| 2005/0051519 A1* | 3/2005 | Satou | B23H 7/04 219/69.12 |
| 2008/0110865 A1* | 5/2008 | Hashimoto | B23H 7/04 219/69.12 |
| 2008/0203068 A1* | 8/2008 | Ukai | B23H 1/024 219/69.13 |
| 2010/0147805 A1* | 6/2010 | Ukai | B23H 1/024 219/69.13 |

FOREIGN PATENT DOCUMENTS

| | | |
|---|---|---|
| JP | 58-211826 A | 12/1983 |
| JP | 63-185524 A | 8/1988 |
| JP | 03-035936 A | 2/1991 |
| JP | 04-354621 A | 12/1992 |
| JP | 05-293714 A | 11/1993 |
| WO | 2008/047451 A1 | 4/2008 |
| WO | 2008/047452 A1 | 4/2008 |

OTHER PUBLICATIONS

Decision of Patent Grant for Corresponding JP 2013-540559 dated Feb. 17, 2014.
International Search Report for PCT/JP2012/007819 dated Mar. 12, 2013.
Communication dated Apr. 6, 2016, from the State Intellectual Property Office of People's Republic of China in counterpart Application No. 201280077549.X.

* cited by examiner

FIG. 5

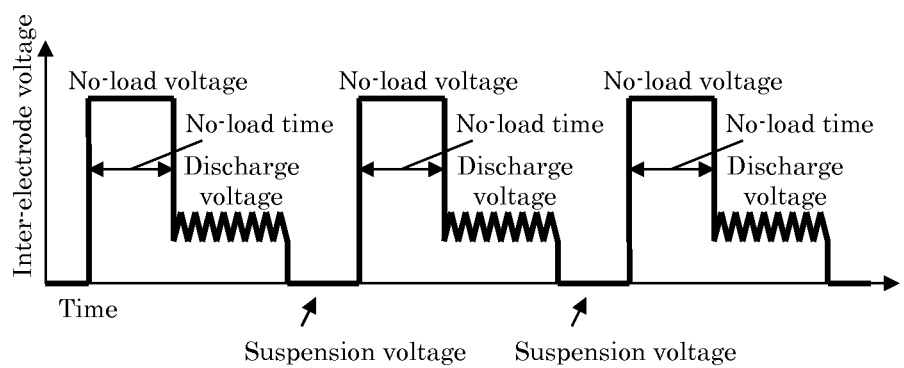

FIG. 6

Table. Relation between machining condition and discharge state

| | Discharge continuation time | Suspension time | Discharge state |
|---|---|---|---|
| Machining condition A | Intermediate value | Equal to discharge continuation time | Only normal discharge (Fig. 2) |
| Machining condition B | Intermediate value | Shorter than discharge continuation time | Coexistence of abnormal discharge (Fig. 3) caused by immediate discharge |
| Machining condition C | Long | Equal to discharge continuation time | Coexistence of abnormal discharge (Fig. 4) caused not by immediate discharge |

ELECTRIC DISCHARGE MACHINING SYSTEM

CROSS REFERENCE TO RELATED APPLICATIONS

This application is a National Stage of International Application No. PCT/JP2012/007819 filed Dec. 6, 2012, the contents of all of which are incorporated herein by reference in their entirety.

TECHNICAL FIELD

The present invention relates to electric discharge machining systems.

BACKGROUND ART

A conventional electric discharge machining system includes a first comparison device that compares the integral of high frequency components of an electric discharge pulse with a reference value, a second comparison device that compares the integral of high frequency components of the electric discharge pulse with a reference value lower than that for the first comparison device, a machining-voltage-level detector that detects a discharge voltage level of a machining gap between an electrode and a workpiece, a comparator that compares an output signal of the machining-voltage-level detector with a reference voltage, a discharge detector that detects discharge voltage and a discharge current of the machining gap between the electrode and the workpiece, and a short-circuit detector that detects a short circuit.

In this electric discharge machining system, as determination outputs classified for each pulse, a pulse controller receives the electric discharge pulse determination outputs from the first comparison device, the second comparison device, and the comparator and two kinds of determination output from the short-circuit detector indicating presence or absence of a short circuit. Then, in a case when an output signal of the short-circuit detector indicates a non-short-circuited discharge pulse and the second comparison device outputs a signal of "H" level, the pulse controller determines that the pulse is an abnormal discharge pulse caused by a high frequency component, to change a suspension time to Toff+ΔToff. In a case when an output signal of the discharge detector indicates "being in electric discharge pulse", and the comparator outputs an output signal of "H" level, the pulse controller determines that the pulse is an abnormal discharge pulse based on a machining voltage level, to terminate the pulse of the discharge voltage and current. In a case of a non-short-circuited normal pulse, the suspension time is controlled to be reset to that before change. As described above, a system has been proposed in which the discharge state is recognized by a high frequency component and a discharge voltage level, so that electric discharge pulses are individually and optimally controlled according to presence or absence of a short circuit state (refer to Patent Document 1).

PRIOR ART DOCUMENT

Patent Document

Patent Document 1: WO08/047452 (page 13, FIG. 5 and FIG. 6)

SUMMARY OF THE INVENTION

Problem to be Solved by the Invention

An electric discharge machining system according to Patent Document 1 determines whether a discharge is an abnormal discharge pulse on the basis of high frequency components or determines whether the discharge is an abnormal discharge pulse on the basis of a machining voltage level, to individually control the discharge pulse. However, some abnormal discharges are caused by immediate discharge, and others are caused not by immediate discharge. The conventional electric discharge machining system (Patent Document 1) does not distinguish an abnormal discharge caused by immediate discharge from that caused not by immediate discharge, which cannot immediately suppress the abnormal discharge, causing unstable machining. Furthermore, there has been a problem that the machining condition is unnecessarily relaxed, lowering the machining speed.

The present invention is made to solve the problems described above, and to provide an electric discharge machining system which distinguishes an abnormal discharge caused by immediate discharge from an abnormal discharge caused not by immediate discharge, to perform an appropriate control in respective cases.

An electric discharge machining system of the present invention that machines a workpiece by producing a discharge between an electrode and the workpiece, includes: a no-load-time detection means that detects no-load time of inter-electrode voltage between the electrode and the workpiece; an immediate-discharge determination means that compares the no-load time detected by the no-load-time detection means with predetermined time to determine whether or not the discharge is an immediate discharge; a voltage detection means that detects the inter-electrode voltage; an abnormal-discharge determination means that compares the voltage detected by the voltage detection means with a predetermined value to determine whether or not the discharge is a normal discharge; a discharge state assessment means that assesses a state of the discharge on the basis of the determination result of the immediate-discharge determination means and the determination result of the abnormal-discharge determination means; and a machining condition control means that controls a machining condition on the basis of the discharge state assessed by the discharge state assessment means.

Effect of the Invention

In a case where an abnormal discharge occurs during electric discharge machining, the abnormal discharge can suitably be suppressed, avoiding machining instability and decrease in machining speed caused by the occurrence of the abnormal discharge.

BRIEF DESCRIPTION OF THE DRAWINGS

FIG. 5 is a schematic diagram showing inter-electrode voltage waveforms when performing electric discharge machining according to Embodiment 1;

FIG. 6 is a table showing relation between machining condition and discharge state according to Embodiment 1;

MODES FOR CARRYING OUT THE INVENTION

Embodiment 1

Figure 1:
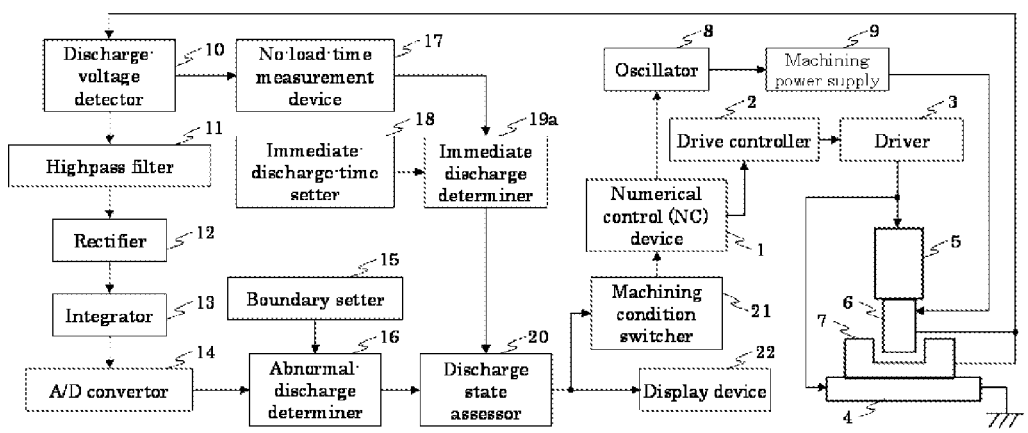
FIG. 1 is a block diagram showing the configuration of an electric discharge machining system according to Embodiment 1.

FIG. 1 is a block diagram showing the whole system of an electric discharge machining system described in Embodiment 1 of the present invention. The configuration of the electric discharge machining system according to Embodiment 1 will be explained with reference to FIG. 1. In FIG. 1, an NC program and machining conditions are inputted to a numerical control (NC) device 1 before starting machining. The numerical control device 1 sends out a position command to a drive controller 2 according to the NC program and the machining conditions. The drive controller 2 sends out a control signal to a driver 3 according to the position command. According to the control signal of the drive controller 2, the driver 3 moves a workpiece table 4 in X-, or Y-axis direction and moves a main shaft 5 in Z-axis direction. By these operations, an electrode 6 and the workpiece 7 are relatively moved in X-, Y-, or Z-axis direction. The numerical control device 1 also sends out the inputted machining conditions to an oscillator 8. The oscillator 8 produces discharge-pulse commands in accordance with the machining conditions, to send them out to a machining power supply 9. The machining power supply 9 applies a pulse voltage between the electrode 6 and the workpiece 7 in accordance with the discharge-pulse commands from the oscillator 8. As described above, machining is performed by producing a discharge between the electrode 6 and the workpiece 7 while moving the electrode 6 and the workpiece 7 relatively at a predetermined speed.

Moreover, in the electric discharge machining system according to Embodiment 1, a discharge-voltage detector 10 detects a voltage during discharge between the electrode 6 and the workpiece 7, namely, a discharge voltage, and sends out information on the detected discharge voltage to a highpass filter 11. The highpass filter 11 extracts high frequency components of the discharge voltage and sends out information on the extracted high frequency components to a rectifier 12. The rectifier 12 rectifies the high frequency components of the discharge voltage and sends out information of the rectified high frequency components of the discharge voltage to an integrator 13. The integrator 13 integrates the rectified high frequency components of the discharge voltage and sends out a value of the integrated high frequency components of the discharge voltage to an A/D convertor 14. The A/D convertor 14 converts the integral of the discharge voltage's high frequency components, namely a discharge voltage integral, to digital data. And then, on the basis of the digital data outputted from the A/D convertor 14 with respect to the integral of the discharge voltage's high frequency components and on the basis of a boundary value set in a boundary setter 15, an abnormal-discharge determiner 16 determines whether or not the discharge is an abnormal discharge.

Furthermore, a no-load-time measurement device 17 measures no-load time on the basis of the inter-electrode voltage detected by the discharge-voltage detector 10. In an immediate-discharge-time setter 18, immediate-discharge time is set in advance. On the basis of the no-load time measured by the no-load-time measurement device 17 and the immediate-discharge time set in the immediate-discharge-time setter 18, an immediate discharge determiner 19a determines whether or not the discharge is an immediate discharge.

A discharge state assessor 20 assesses a discharge state from the determination results of the abnormal-discharge determiner 16 and the immediate discharge determiner 19a. And then, according to the determination result of the discharge state assessor 20, a machining condition switcher 21 sends out a condition switch signal to the numerical control device 1 to change the machining conditions set in the numerical control device 1. That is, the machining condition switcher 21 performs control for changing machining conditions. A display device 22 displays the determination result about the discharge state determined by the discharge state assessor 20.

(Explanation of the Principle of Embodiment 1 According to the Present Invention)

Before explaining operations according to Embodiment 1, the principle of Embodiment 1 will be explained below. In a die sinking electric discharge machine, discharge concentration occurring in a period shorter than a response time of electrode feeding leads to unstable machining (an arc state), sometimes producing an arc mark on the workpiece. When the arc mark is produced, the surface roughness and the shape accuracy are deteriorated. In order to prevent this, an operation is performed in which an inter-electrode discharge state is assessed, and then the machining condition is controlled according to the assessed discharge state.

Explanation will be made about assessment of a discharge state. Electric discharge pulses include a normal discharge effective for machining and an abnormal discharge ineffective for machining. As indexes used for assessing these discharge states, there are mentioned a DC component (an arc potential) of the discharge voltage, a high frequency component thereof, an inter-electrode average voltage in a suspension time during which no pulse voltage is applied, and the like.

In this embodiment, these are collectively called as a discharge state assessment index; and explanation will be made about an example in which the high frequency component of the discharge voltage is used as the discharge state assessment index. In addition, in a case where a high frequency component of the discharge voltage is used, more precisely, an integral of the high frequency component, or an integrated discharge voltage, is used as the discharge state assessment index for assessing the discharge state.

Figure 2:
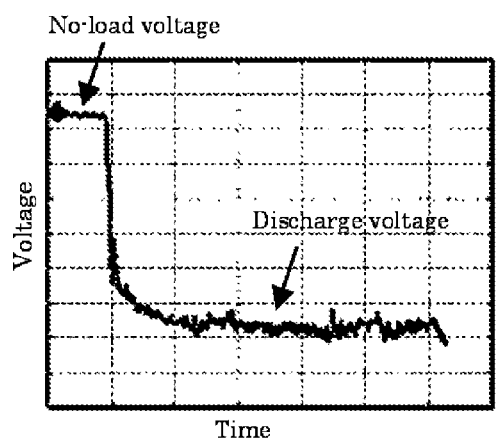
FIG. 2 shows an inter-electrode voltage waveform of a normal discharge in Embodiment 1.
Figure 3:
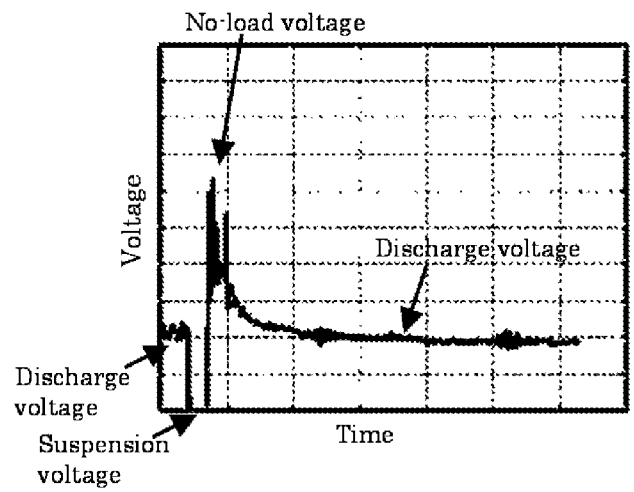
FIG. 3 shows an inter-electrode voltage waveform of an abnormal discharge caused by immediate discharge in Embodiment 1.
Figure 4:
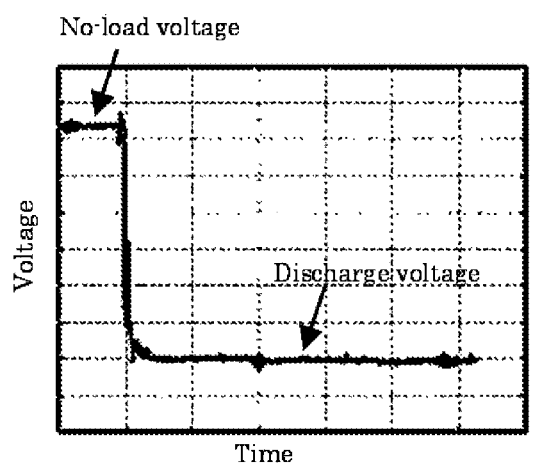
FIG. 4 shows an inter-electrode voltage waveform of an abnormal discharge caused not by immediate discharge in Embodiment 1.

When the high frequency component of the discharge voltage is taken as the discharge state assessment index, it is known that a normal discharge effective for machining is a discharge having a large amplitude in the high frequency component, and an abnormal discharge ineffective for machining is a discharge having a small amplitude in the high frequency component. FIG. 2 shows an inter-electrode voltage waveform in a normal discharge, and FIG. 3 and FIG. 4 show inter-electrode voltage waveforms in abnormal discharges. FIG. 5 is a schematic diagram of inter-electrode voltage waveforms when performing electric discharge machining. Here, no-load time is a period starting from application of a pulse voltage between the electrode 6 and the workpiece 7 and ending with occurrence of a discharge. No-load voltage is an inter-electrode voltage during the no-load time.

When the amplitudes of high frequency components of the discharge voltages are compared, it is found that a high frequency component in FIG. 2 has an amplitude larger than those in FIG. 3 and FIG. 4. As described above, the inter-electrode discharge states are classified into a normal discharge or an abnormal discharge; when the electric discharge pulse is assessed as an abnormal discharge, the machining condition is changed (relaxed). By changing the machining condition, machining is prevented from becoming unstable.

Here, the inventors variously changed the machining condition to analyze discharge voltages in detail, thereby finding that an abnormal discharge can be classified either into that caused by immediate discharge or into that caused not by immediate discharge. FIG. 3 and FIG. 4 show inter-electrode voltage waveforms when machining in different machining conditions. FIG. 3 shows that no-load voltage does not rise sufficiently, and after extremely short no-load time, a discharge occurs. This is because the discharge is considered to occur in a state close to a short circuit through sludge between electrodes. Through experiments, the inventors have found that over 80% of immediate discharge pulses develop into abnormal discharges.

On the other hand, FIG. 4 shows that after a no-load voltage sufficiently rises, and then after sufficiently long no-load time elapses, a discharge occurs. As described above, it is thought that an abnormal discharge is classified either into that caused by immediate discharge or into that caused not by immediate discharge. The abnormal discharge shown in FIG. 3 will be referred to as an abnormal discharge caused by immediate discharge, and the abnormal discharge shown in FIG. 4 will be referred to as an abnormal discharge caused not by immediate discharge.

Next, explanation will be made about relation between machining condition and discharge state. In addition, explanation will be made here under an assumption that the machining conditions indicate discharge continuation time and suspension time. A table shown in FIG. 6 indicates machining conditions in which the inter-electrode voltage waveforms shown in FIG. 2 through FIG. 4 were obtained. Machining condition A is a machining condition in which the waveform shown in FIG. 2 was obtained. Machining condition B is a machining condition in which the waveform shown in FIG. 3 was obtained. Machining condition C is a machining condition in which the waveform shown in FIG. 4 was obtained. In addition, discharge continuation time is set to be a period during which discharge is kept produced between the electrode 6 and the workpiece 7. The discharge continuation time corresponds to a period during which discharge voltage is being detected in FIG. 5. Furthermore, suspension time is set to be a period during which to suspend application of a pulse voltage. The suspension time corresponds to a period during which suspension voltage is being detected in FIG. 5.

In machining condition A in which the discharge continuation time is set as an intermediate value in an allowable setting range, and the suspension time is set so as to be equal to the discharge continuation time, only normal discharges were produced as shown in FIG. 2. In machining condition B in which the discharge continuation time is set as an intermediate value in the allowable setting range, and the suspension time is set so as to be shorter than the discharge continuation time, abnormal discharges caused by immediate discharges shown in FIG. 3 were produced together with normal discharges. In machining condition C in which the discharge continuation time is set as a longer one in the allowable setting range, and the suspension time is set so as to be equal to the discharge continuation time, abnormal discharges caused not by immediate discharges shown in FIG. 4 were produced together with normal discharges.

Comparison between machining condition A and machining condition B shows that in machining condition B, in which the abnormal discharges caused by the immediate discharge were produced together, the suspension time is set so as to be shorter than the intermediate value of the allowable setting range; thus, it can be said that the abnormal discharge caused by the immediate discharge is related to the suspension time. And therefore, in order to suppress the abnormal discharges caused by immediate discharges, it is only necessary to change the machining condition from machining condition B to machining condition A in which abnormal discharges are not produced together. That is, the abnormal discharges caused by immediate discharges can be suppressed by increasing the suspension time.

Comparison between machining condition A and machining condition C shows that the ratio of the discharge continuation time to the suspension time is the same, but shows that in machining condition C in which abnormal discharges caused not by immediate discharges were produced together, the discharge continuation time is set as a longer one in the allowable setting range. Although a sufficiently long suspension time is set in machining condition C, abnormal discharges were produced; this reveals that in a case where the discharge continuation time is increased, abnormal discharges are produced together even when a long suspension time is set. In addition, the longer the discharge continuation time, the more the amount of carbon included in the machining oil is attached to the electrode. Depending on the length of the discharge continuation time, the electrode may be extremely less consumed, or the amount of carbon attaching to the electrode may exceed the amount of electrode consumption. That is, it can be said that the abnormal discharges caused not by immediate discharges depend on the discharge continuation time; therefore, increasing the suspension time brings a little effect on suppressing the abnormal discharges.

And therefore, in order to suppress the abnormal discharges caused not by immediate discharges, it is only necessary to change the machining condition from machining condition C to machining condition A in which abnormal discharges are not produced together. That is, the abnormal discharges caused not by immediate discharges can be suppressed by reducing the discharge continuation time. Reducing only the discharge continuation time prevents the abnormal discharges caused not by immediate discharges from occurring; however, this increases suspension time per unit time, thereby lowering the machining speed. For this reason, it is necessary, for example, to change the discharge continuation time and the suspension time so as to keep the ratio of the discharge continuation time to the suspension time, unchanged.

As described above, some abnormal discharges are caused by immediate discharge, and others are caused not by immediate discharge. In order to suppress abnormal discharges having these different factors, it is necessary to individually change different machining condition parameters. Therefore, not only abnormal discharge determination but also immediate discharge determination are performed for each electric discharge pulse, so that an abnormal discharge is determined as that caused by immediate discharge or as that caused not by immediate discharge. After that, if machining condition parameters suitable for suppressing respective abnormal discharges are selected and then the machining conditions are thereby changed, both abnormal discharges can be prevented in early stages.

Figure 7:
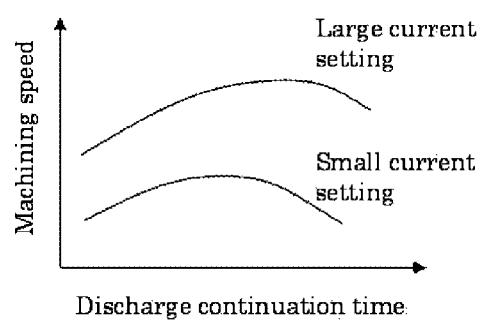
FIG. 7 is a graph showing relation between discharge continuation time and machining speed according to Embodiment 1.

Next, explanation will be made about relation between discharge continuation time and machining speed. FIG. 7 illustrates the relation between discharge continuation time and machining speed. When machining is performed with discharge continuation time being varied as shown in FIG. 7, if the discharge continuation time is shorter than a certain period, the larger the discharge continuation time is set, the larger the machining speed becomes. However, if machining is performed with discharge continuation time being set longer than the certain period, the machining speed becomes smaller. This is because excessively long discharge continuation time causes an abnormal discharge to begin coexisting. Therefore, when it is determined that an electric discharge pulse is a normal discharge, the discharge continuation time is increased; when determined that an electric discharge pulse is an abnormal discharge caused not by immediate discharge, the discharge continuation time is reduced. As described above, not only by preventing the abnormal discharge from occurring, but also by increasing the discharge continuation time in a range where the abnormal discharge does not occur, stabilization in machining and improvement in machining speed can be achieved.

In a case where the discharge state assessor 20 determines that an electric discharge pulse is an abnormal discharge caused not by immediate discharge, the discharge state assessor sends out the determination result to the machining condition switcher 21. The machining condition switcher 21 sends out the condition switch signal to the numerical control device 1 so as to reduce the discharge continuation time. The numerical control device 1 sends out to the oscillator 8, the machining conditions including a changed discharge continuation time. The oscillator 8 produces a discharge-pulse command according to the machining conditions in which the discharge continuation time is changed, and sends out the command to the machining power supply 9. In accordance with the discharge-pulse command from the oscillator 8, the machining power supply 9 applies a pulse voltage between the electrode 6 and the workpiece 7. The next electric discharge pulse is thus generated in accordance with the machining conditions in which the discharge continuation time is reduced.

In a case where it is determined that the next electric discharge pulse is also an abnormal discharge caused not by immediate discharge, that is, a case where an abnormal discharge caused not by immediate discharge cannot be suppressed even with the discharge continuation time being reduced, the discharge continuation time is further reduced. Thus, an electric discharge pulse after the next electric discharge pulse is generated in accordance with the machining conditions in which the discharge continuation time is further reduced. When it is determined that the electric discharge pulse is a normal discharge, that is, if an abnormal discharge caused not by immediate discharge is successfully suppressed, the discharge continuation time is extended this time. That is, it is beneficial to improve the machining speed by generating an electric discharge pulse in accordance with machining conditions in which the discharge continuation time is extended. This has been the explanation of the principle.

Figure 8:
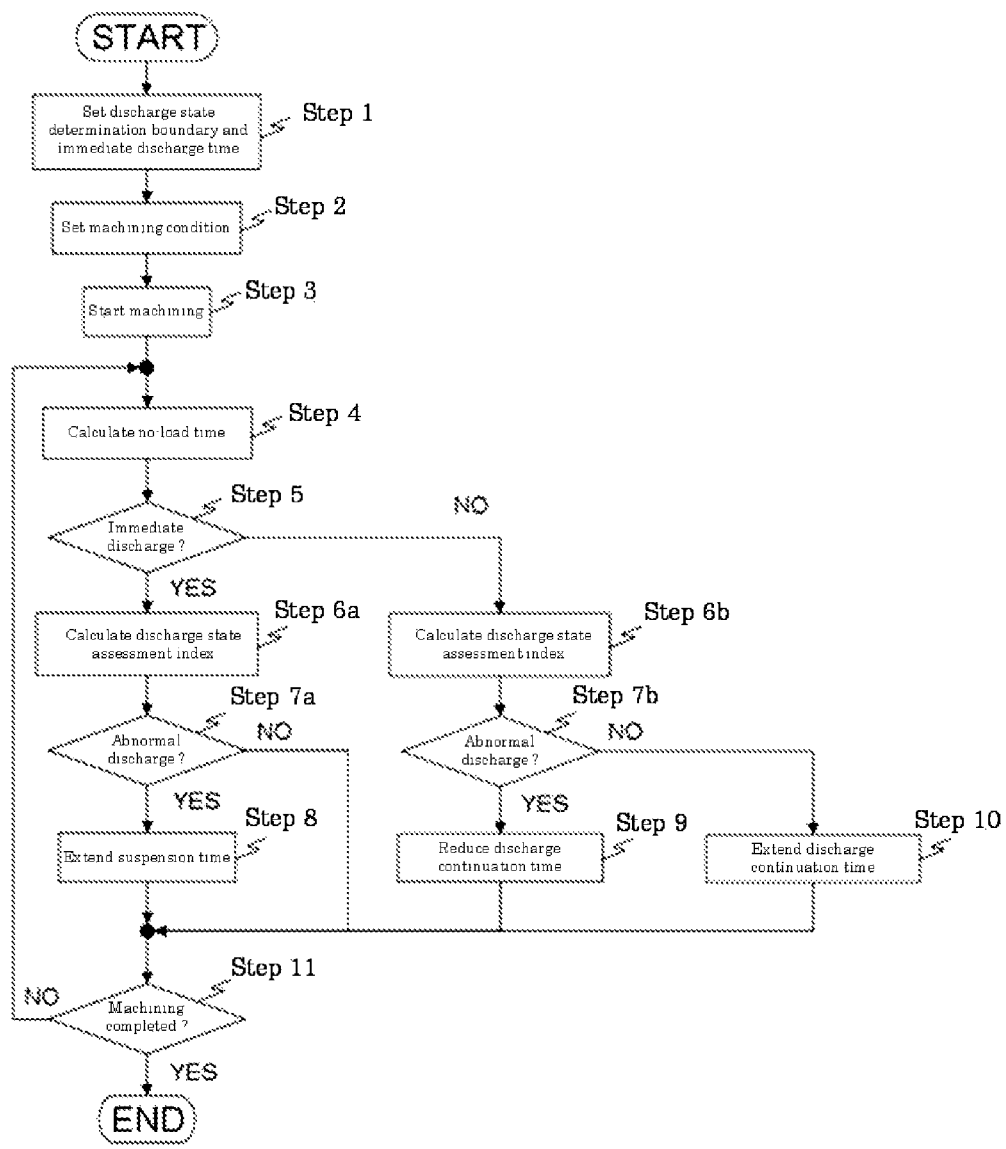
FIG. 8 is a flow chart explaining operations according to Embodiment 1.

Next, operations according to Embodiment 1 will be explained, referring to FIG. 1 and FIG. 8. FIG. 8 is a flow chart explaining operations according to Embodiment 1.

Before start of machining, a boundary value for distinguishing the normal discharge and the abnormal discharge is set in the boundary setter 15. Furthermore, no-load time for determining that an electric discharge pulse is an immediate discharge is set in the immediate-discharge-time setter 18 (Step 1). In addition, the setting may be performed before the manufacturer ships the system.

The no-load time for determining that an electric discharge pulse is an immediate discharge can be obtained by finding out no-load time which an abnormal discharge follows with respect to almost all electric discharge pulses; the no-load time is set, for example, at 5 µs. Furthermore, the boundary value between the normal discharge and the abnormal discharge can be obtained as follows. The discharge state assessment index data in a case where normal discharges and abnormal discharges are produced together is obtained to draw a histogram of the discharge state assessment indexes. In the histogram, there appear two mountain peaks of normal discharge and abnormal discharge; then, it can be determined that a value corresponding to a valley between the two mountain peaks is a boundary value. Another way to determine the boundary value is to use the upper or lower limit value to produce abnormal discharges; or, the boundary value may be appropriately set according to normal and abnormal discharge occurrence states when performing electric discharge machining.

Next, the machining conditions are set in the numerical control device 1 (Step 2).

After completing the setting, machining is started (Step 3). After machining is started, the no-load-time measurement device 17 measures no-load time with respect to every electric discharge pulse, and sends out the no-load time to the immediate discharge determiner 19a (Step 4). When the no-load time measured by the no-load-time measurement device 17 is shorter than the immediate-discharge time set in the immediate-discharge-time setter 18, the immediate discharge determiner 19a determines that the electric discharge pulse is an immediate discharge, and sends out an immediate discharge signal to the discharge state assessor 20 (Step 5).

Here, the no-load time is measured, for example, as follows. The no-load-time measurement device 17 captures information of inter-electrode voltage between the electrode 6 and the workpiece 7 detected by the discharge-voltage detector 10. When the beginning of the no-load voltage application is detected from the voltage information, the no-load time measurement is started. After that, when detecting that an electric discharge occurs, the no-load time measurement is completed. Furthermore, the no-load-time measurement device 17 may receive from the oscillator 8 pulse signals for applying the no-load voltage, to start the no-load time measurement when detecting the beginning of the no-load voltage application and to complete the measurement when detecting an electric discharge occurrence. Moreover, the no-load-time measurement device 17 may receive information of pulse voltages between the electrode 6 and the workpiece 7 applied by the machining power supply 9, to detect, from the pulse voltage information, the beginning of the no-load voltage application and the occurrence of electric discharges and to thereby measure the no-load time.

The discharge-voltage detector 10 detects voltage applied between the electrode 6 and the workpiece 7, to send it to the highpass filter 11. The highpass filter 11 extracts high frequency components of the discharge voltage to send them out to the rectifier 12. The cut-off frequency of the highpass filter is set as, for example, a frequency larger than a response frequency at which the inter-electrode voltage falls from the no-load voltage to the arc potential immediately after discharging. The rectifier 12 performs full-wave rectification or half-wave rectification on the high frequency components of the discharge voltage, to send them out to the integrator 13. The integrator 13 integrates the high frequency components of the rectified discharge voltage to send out the integral to the A/D convertor 14. The A/D convertor 14 converts the integrated value of the discharge voltage's high frequency components into digital data, and then sends out, as a discharge state assessment index, the digital data to the abnormal-discharge determiner 16 (Step 6a, Step 6b).

The abnormal-discharge determiner 16 compares the boundary value set in the boundary setter 15 with the integral data on the discharge voltage's high frequency components, to determine whether or not the electric discharge pulse is an abnormal discharge (Step 7a, Step 7b). More specifically, when the integral data on the discharge voltage's high frequency components is smaller than the boundary value, the abnormal-discharge determiner determines that the electric discharge pulse is an abnormal discharge. In a case where the abnormal-discharge determiner determines that the electric discharge pulse is an abnormal discharge, the abnormal-discharge determiner 16 sends out an abnormal discharge signal to the discharge state assessor 20.

Here, explanation has been made using, as the discharge state assessment index, the integrated value on the discharge voltage's high frequency components, that is, the discharge voltage integral; however, the discharge state assessment index is not limited thereto. For example, another index such as the DC component (arc potential) of the discharge voltage, or inter-electrode average voltage during suspension time in which pulse voltage is not applied may be used as the discharge state assessment index. In a case where one of these indexes is used as the discharge state assessment index, the abnormal-discharge determiner 16 similarly operates; that is, when the abnormal-discharge determiner determines that the electric discharge pulse is an abnormal discharge, the abnormal-discharge determiner sends out the abnormal discharge signal to the discharge state assessor 20.

When receiving the immediate discharge signal and the abnormal discharge signal, the discharge state assessor 20 determines that the electric discharge pulse is an abnormal discharge caused by immediate discharge. When receiving only the abnormal discharge signal, the discharge state assessor 20 determines that the electric discharge pulse is an abnormal discharge caused not by immediate discharge. When receiving neither the immediate discharge signal nor the abnormal discharge signal, the discharge state assessor 20 determines that the electric discharge pulse is a normal discharge. Also when receiving only the immediate discharge signal, the discharge state assessor 20 determines that the electric discharge pulse is a normal discharge. The discharge state assessor 20 then sends out the determination result to the machining condition switcher 21. In a case where a normal discharge determination is made in response to receiving only the immediate discharge signal, the discharge state assessor 20 may send out to the machining condition switcher 21, a determination result that the electric discharge pulse is a normal discharge after immediate discharge.

The display device 22 displays the result of the discharge state determined by the discharge state assessor 20. In addition, the display device 22 may display only the discharge state, using lamps or the like, or, a device for displaying other information such as a display monitor may display the discharge state together.

When the machining condition switcher 21 receives a determination result that the electric discharge is an abnormal discharge caused by immediate discharge, the machining condition switcher sends out toward the numerical control device 1 the condition switch signal to extend the suspension time, so that the numerical control device 1 extends the suspension time (Step 8).

When the machining condition switcher 21 receives a determination result that the electric discharge is a normal discharge after immediate discharge, the machining condition switcher does not send out the condition switch signal toward the numerical control device 1.

When the machining condition switcher 21 receives a determination result that the electric discharge is an abnormal discharge caused not by immediate discharge, the machining condition switcher sends out toward the numerical control device 1 the condition switch signal to reduce the discharge continuation time, so that the numerical control device 1 reduces the discharge continuation time (Step 9).

When the machining condition switcher 21 receives a determination result that the electric discharge is a normal discharge, the machining condition switcher sends out toward the numerical control device 1 the condition switch signal to extend the discharge continuation time, so that the numerical control device 1 extends the discharge continuation time (Step 10).

By the NC program's statement to complete the machining, the numerical control device 1 determines whether or not to terminate the machining; if not to terminate, the process returns to Step 4 (Step 11).

As described above, an abnormal discharge is classified either to an abnormal discharge caused by immediate discharge or to an abnormal discharge caused not by immediate discharge. Therefore, a suitable machining condition parameter to suppress each abnormal discharge can be selected to change the machining conditions, thereby suppressing either abnormal discharge in early stages. Furthermore, when an abnormal discharge occurs, it is possible to avoid unnecessarily relaxing the machining conditions, thereby preventing the machining speed from being lowered. Moreover, when a normal discharge occurs, the machining speed can be improved by controlling to extend the discharge continuation time. That is, depending on a normal discharge or an abnormal discharge caused not by immediate discharge, the discharge continuation time is controlled into a suitable one, achieving both improvement in machining speed and stabilization in machining.

Embodiment 2

Figure 9:
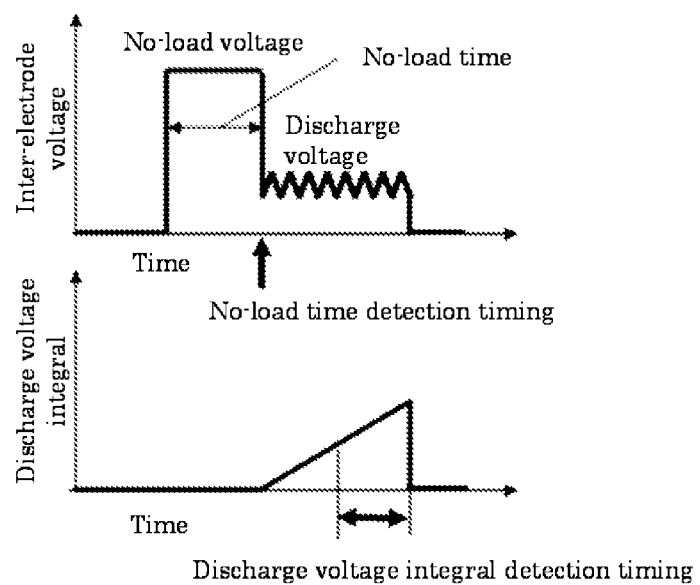
FIG. 9 are graphs indicating no-load time and a timing to detect a discharge voltage integral according to Embodiment 2.

Before explaining operations according to Embodiment 2, the principle of Embodiment 2 will be explained below. FIG. 9 are graphs indicating no-load time and a timing to detect the discharge voltage integral. The no-load time can be detected at the instance when an electric discharge occurs; similarly, an immediate discharge determined by the no-load time can also be detected at the instance when the electric discharge occurs. On the other hand, integration time is required to calculate a discharge voltage integral used as the discharge state assessment index in Embodiment 1. Therefore, a timing to detect the discharge voltage integral is after a certain period following the beginning of discharge, as shown in FIG. 9.

Also in a case where the DC component (arc potential) of the discharge voltage is used as the discharge state assessment index, it is necessary to detect the discharge voltage. Therefore, a detection timing is after a certain period following the beginning of discharge. Furthermore, in a case where the inter-electrode average voltage during suspension time in which pulse voltage is not applied is used, detection is made during suspension after the discharge ends. Therefore, the detection timing is further delayed, to be after the discharge ends.

Here, as described in Embodiment 1, many of the immediate discharge pulses develop into abnormal discharges. Therefore, if it is determined, at the instance of the immediate discharge determination, that the discharge pulse is an abnormal discharge, abnormal discharge determination can be made at a timing earlier than abnormal discharge determination using the discharge voltage integral.

Abnormal discharges do not contribute to machining; therefore, in the abnormal discharge state, it does not make sense to keep discharging for the discharge continuation time being set. As described before, an immediate discharge can be determined at the instance when an electric discharge occurs; therefore, if it is determined that the electric discharge is an abnormal discharge at the instance when the electric discharge pulse is determined as an immediate discharge, it is also possible to stop applying the discharge voltage. By stopping applying the discharge voltage, the abnormal discharge giving no contribution to machining is prevented from continuing, thereby improving efficiency in machining.

Figure 10:
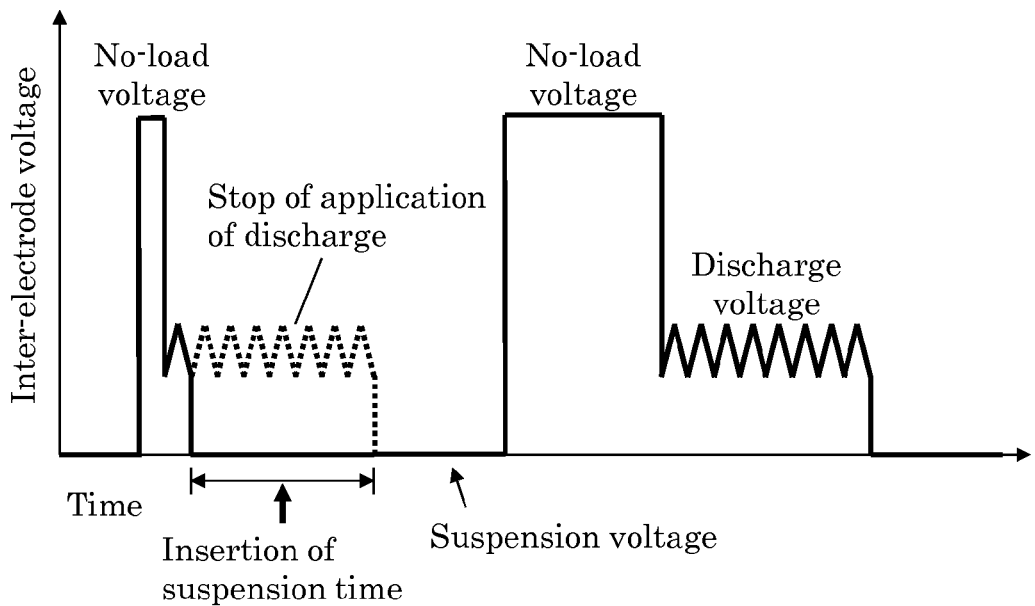
FIG. 10 is a graph indicating a discharge voltage of an immediate discharge according to Embodiment 2.

In Embodiment 1, it has been explained that when determined that the electric discharge is an abnormal discharge caused by immediate discharge, the abnormal discharge can be suppressed by extending the suspension time. Therefore, as illustrated in FIG. 10, by determining, at the instance of immediate discharge determination, that the discharge pulse is an abnormal discharge caused by immediate discharge, terminating application of the discharge voltage, and instead inserting suspension to extend suspension time in addition to the suspension time based on the machining condition, the abnormal discharge can be suppressed further earlier.

Figure 11:
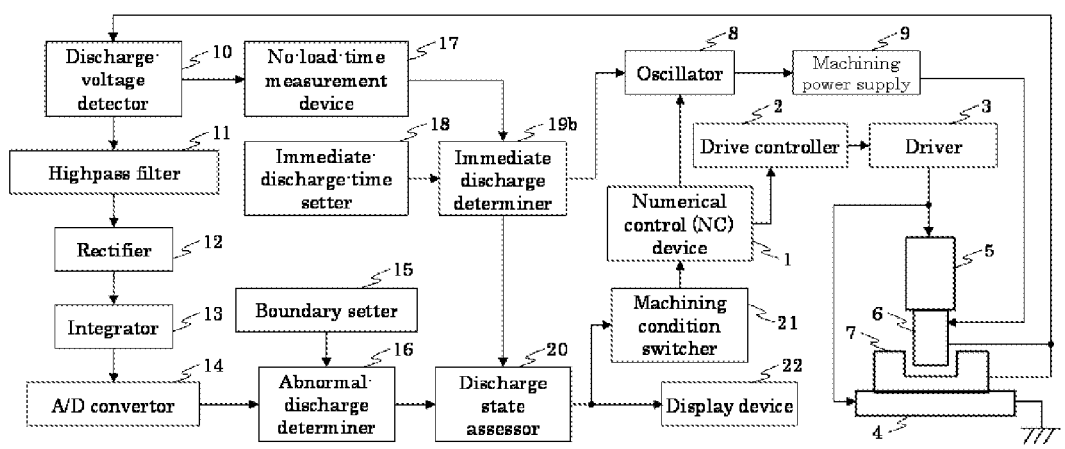
FIG. 11 is a block diagram showing the configuration of an electric discharge machining system according to Embodiment 2.
Figure 12:
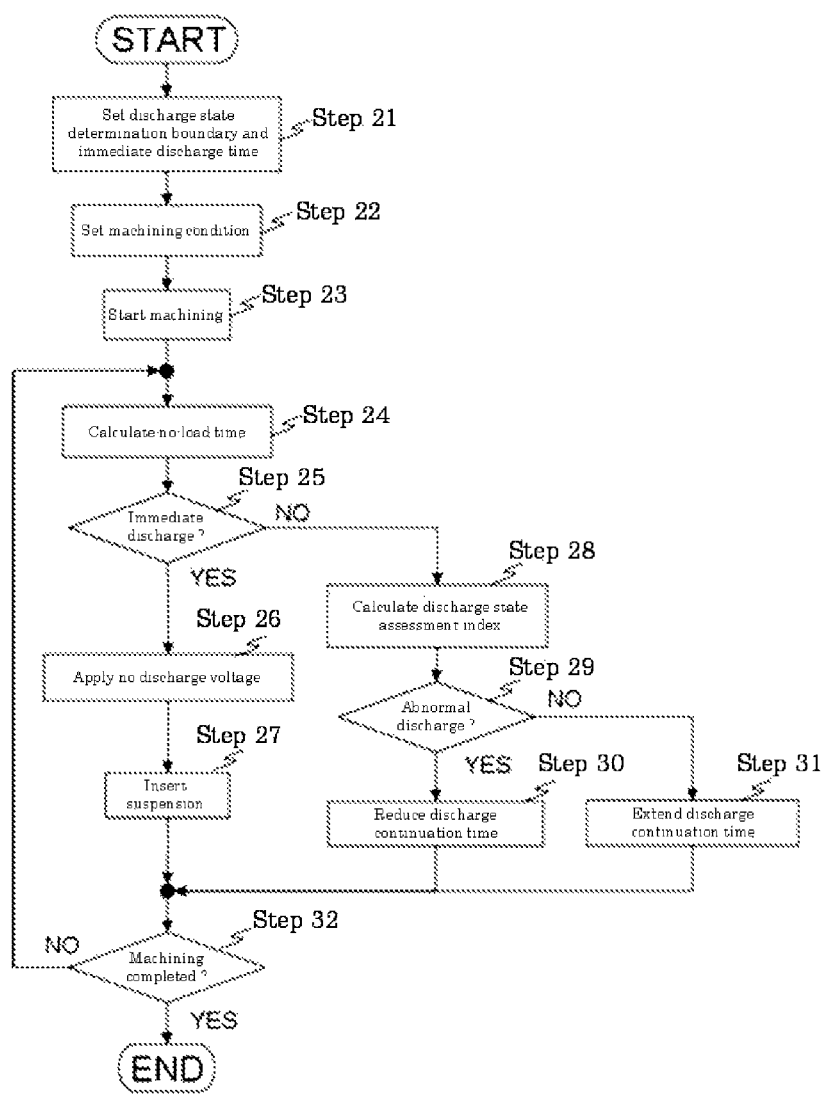
FIG. 12 is a flow chart explaining operations according to Embodiment 2.

Next, operations according to Embodiment 2 will be explained referring to FIG. 11 and FIG. 12. FIG. 11 is a diagram illustrating an electric discharge machining system to be described in Embodiment 2 of the present invention; the electric discharge machining system has a same configuration as that of FIG. 1 except for being provided with an immediate discharge determiner 19b which is a substitution of the immediate discharge determiner 19a and sends out the determination result signal thereof additionally to the oscillator 8. FIG. 12 is a flow chart explaining operations according to Embodiment 2.

In FIG. 11, operations which the abnormal-discharge determiner 16 performs until determining the abnormal discharge, and operations which the immediate discharge determiner 19b performs until determining the immediate discharge are the same as those in Embodiment 1. Furthermore, operations performed until Step 25 in FIG. 12 are the same as those until Step 5 in Embodiment 1. Therefore, explanation will be made from Step 26.

When the immediate discharge determiner 19b determines that the discharge pulse is an immediate discharge, the immediate discharge determiner sends out the immediate discharge signal to the oscillator 8 and the discharge state assessor 20. When the oscillator 8 receives the immediate discharge signal, the oscillator stops outputting the discharge voltage application pulse to be sent out to the machining power supply 9 (Step 26).

When the discharge state assessor 20 receives the immediate discharge signal, the discharge state assessor determines that the electric discharge pulse is an abnormal discharge caused by immediate discharge, and then sends out the determination result to the machining condition switcher 21. When the machining condition switcher 21 receives the determination result that the electric discharge pulse is an abnormal discharge caused by immediate discharge, the machining condition switcher sends out toward the numerical control device 1 a condition switch signal to insert a suspension time, so that the numerical control device 1 inserts the suspension time (Step 27).

When the immediate discharge determiner 19b does not determine that the electric discharge pulse is an immediate discharge, a discharge state assessment index is calculated, according to the same procedure as that in Embodiment 1, from the discharge voltage detected by the discharge-voltage detector 10, to be sent out to the abnormal-discharge determiner 16 (Step 28). The abnormal-discharge determiner 16 determines, on the basis of the discharge state assessment index and the boundary value set in the boundary setter 15, whether or not the electric discharge pulse is an abnormal discharge; in a case where determining that the electric discharge pulse is an abnormal discharge, the abnormal-discharge determiner sends out an abnormal discharge signal to the discharge state assessor 20 (Step 29).

When the discharge state assessor 20 does not receive an immediate discharge signal but receives an abnormal discharge signal, the discharge state assessor determines that the electric discharge pulse is an abnormal discharge caused not by immediate discharge, to send out the determination result to the machining condition switcher 21. Furthermore, when the discharge state assessor 20 receives neither an immediate discharge signal nor an abnormal discharge signal, the discharge state assessor determines that the electric discharge pulse is a normal discharge, to send out the determination result to the machining condition switcher 21. The display device 22 displays the result of the discharge state determined by the discharge state assessor 20.

When the machining condition switcher 21 receives a determination result that the electric discharge pulse is an abnormal discharge caused not by immediate discharge, the machining condition switcher sends out toward the numerical control device 1 the condition switch signal to reduce the discharge continuation time, so that the numerical control device 1 reduces the discharge continuation time (Step 30).

When the machining condition switcher 21 receives a determination result that the electric discharge pulse is a normal discharge, the machining condition switcher send out toward the numerical control device 1 a condition switch signal to extend the discharge continuation time, so that the numerical control device 1 extends the discharge continuation time (Step 31).

By the NC program's statement to complete the machining, the numerical control device 1 determines whether or not to terminate the machining; if not to terminate, the process returns to Step 4 (Step 32).

According to the above configuration, it is determined at a discharge detection timing that the electric discharge pulse is an abnormal discharge caused by immediate discharge, to stop applying the discharge voltage; this prevents an abnormal discharge giving no contribution to machining from continuing, thereby improving efficiency in machining. Furthermore, by inserting suspension instead of applying the discharge voltage, the abnormal discharge can be suppressed earlier.

NUMERAL EXPLANATION 1 numerical control (NC) device
2 drive controller
3 driver
4 workpiece table
5 main shaft
6 electrode
7 workpiece
8 oscillator
9 machining power supply
10 discharge-voltage detector
11 highpass filter
12 rectifier
13 integrator
14 A/D convertor
15 boundary setter
16 abnormal-discharge determiner
17 no-load-time measurement device
18 immediate-discharge-time setter
19a, 19b immediate discharge determiner
20 discharge state assessor
21 machining condition switcher
22 display device

The invention claimed is:

1. An electric discharge machining system that machines a workpiece by producing a discharge between an electrode and the workpiece, comprising:
 a no-load-time detector that detects no-load time of inter-electrode voltage between the electrode and the workpiece;
 an immediate-discharge determiner that compares the no-load time detected by the no-load-time detector with predetermined time and determines whether the discharge is an immediate discharge or a non-immediate discharge based on a result of the comparing the no-load time with the predetermined time;
 a voltage detector that detects the inter-electrode discharge voltage;
 an abnormal-discharge determiner that compares the value of a high frequency component of the discharge voltage detected by the voltage detector with a predetermined value and determines whether the discharge is a normal discharge or an abnormal discharge based on a result of the comparing the value of the high frequency component with the predetermined value; and
 a discharge state assessor that determines whether the abnormal discharge is an abnormal non-immediate discharge or an abnormal immediate discharge based on the determination of the immediate-discharge determiner and the determination of the abnormal-discharge determiner; wherein
 the discharge is determined as the normal discharge in response to the electric discharge machining system being in a first machining condition in which a discharge continuation time has a first intermediate value in an allowable setting range,
 the discharge is determined as the abnormal immediate discharge in response to the electric discharge machining system being in a second machining condition in which the discharge continuation time has a second intermediate value in the allowable setting range and a suspension time is shorter than the discharge continuation time,
 the discharge is determined as the abnormal non-immediate discharge in response to the electric discharge machining system being in a third machining condition in which the discharge continuation time is longer than the first and second intermediate values,
 the suspension time in the first machining condition and the third machining condition is longer than the suspension time in the second machining condition, and
 the electric discharge machining system further comprises a machining condition controller that extends the suspension time in response to the discharge being determined as the abnormal immediate discharge.

2. The electric discharge machining system according to claim 1,
 wherein the machining condition controller reduces the discharge continuation time in response to the discharge being determined as the abnormal non-immediate discharge.

3. The electric discharge machining system according to claim 1, further comprising
 an oscillator that commands that pulse voltage is applied between the electrode and the workpiece,
 wherein the oscillator commands that the voltage application is stopped in response to the discharge being determined as the immediate discharge.

4. The electric discharge machining system according to claim 3,
 wherein the machining condition controller inserts a suspension time in response to the discharge being determined as the abnormal immediate discharge.

5. The electric discharge machining system according to claim 1,
 wherein the machining condition controller extends the discharge continuation time in response to the discharge being determined as the non-immediate discharge and the normal discharge.

6. An electric discharge machining system that machines a workpiece by producing a discharge between an electrode and the workpiece, comprising:
 a no-load-time detector that detects no-load time of inter-electrode voltage between the electrode and the workpiece;
 an immediate-discharge determiner that compares the no-load time detected by the no-load-time detector with predetermined time and determines whether the discharge is an immediate discharge or a non-immediate discharge based on a result of the comparing the no-load time with the predetermined time;
 a voltage detector that detects the inter-electrode voltage;
 an abnormal-discharge determiner that compares the voltage detected by the voltage detector with a predetermined value and determines whether the discharge is a normal discharge or an abnormal discharge based on a result of the comparing the value of the high frequency component with the predetermined value; and
 a discharge state assessor that determines whether the abnormal discharge is an abnormal non-immediate discharge or an abnormal immediate discharge based on the determination of the immediate-discharge determiner and the determination of the abnormal-discharge determiner; wherein
the discharge is determined as the normal discharge in response to the electric discharge machining system being in a first machining condition in which a discharge continuation time has a first intermediate value in an allowable setting range,
the discharge is determined as the abnormal immediate discharge in response to the electric discharge machining system being in a second machining condition in which the discharge continuation time has a second intermediate value in the allowable setting range and a suspension time is shorter than the discharge continuation time,
the discharge is determined as the abnormal non-immediate discharge in response to the electric discharge machining system being in a third machining condition in which the discharge continuation time is longer than the first and second intermediate values,
the suspension time in the first machining condition and the third machining condition is longer than the suspension time in the second machining condition, and
the electric discharge machining system further comprises a machining condition controller that reduces the discharge continuation time in response to the discharge being being determined as the abnormal immediate discharge.

7. An electric discharge machining system that machines a workpiece by producing a discharge between an electrode and the workpiece, comprising:
a no-load-time detector that detects no-load time of inter-electrode voltage between the electrode and the workpiece;
an immediate-discharge determiner that compares the no-load time detected by the no-load-time detector with predetermined time and determines whether the discharge is an immediate discharge or a non-immediate discharge based on a result of the comparing the no-load time with the predetermined time;
a voltage detector that detects the inter-electrode voltage;
an abnormal-discharge determiner that compares the voltage detected by the voltage detector with a predetermined value and determines whether the discharge is a normal discharge or an abnormal discharge based on a result of the comparing the value of the high frequency component with the predetermined value; and
a discharge state assessor that determines whether the abnormal discharge is an abnormal non-immediate discharge or an abnormal immediate discharge based on the determination of the immediate-discharge determiner and the determination of the abnormal-discharge determiner; wherein
the discharge is determined as the normal discharge in response to the electric discharge machining system being in a first machining condition in which a discharge continuation time has a first intermediate value in an allowable setting range,
the discharge is determined as the abnormal immediate discharge in response to the electric discharge machining system being in a second machining condition in which the discharge continuation time has a second intermediate value in the allowable setting range and a suspension time is shorter than the discharge continuation time,
the discharge is determined as the abnormal non-immediate discharge in response to the electric discharge machining system being in a third machining condition in which the discharge continuation time is longer than the first and second intermediate values,
the suspension time in the first machining condition and the third machining condition is longer than the suspension time in the second machining condition, and
the electric discharge machining system further comprises an oscillator that commands that pulse voltage is applied between the electrode and the workpiece, and in response to the discharge being determined as the immediate discharge, commands that the voltage application is stopped, and
the electric discharge machining system further comprises a machining condition controller that inserts a suspension time in response to the discharge being determined as the abnormal immediate discharge.

8. An electric discharge machining system that machines a workpiece by producing a discharge between an electrode and the workpiece, comprising:
a no-load-time detector that detects no-load time of inter-electrode voltage between the electrode and the workpiece;
an immediate-discharge determiner that compares the no-load time detected by the no-load-time detector with predetermined time and determines whether the discharge is an immediate discharge or a non-immediate discharge based on a result of the comparing the no-load time with the predetermined time;
a voltage detector that detects the inter-electrode voltage;
an abnormal-discharge determiner that compares the voltage detected by the voltage detector with a predetermined value and determines whether the discharge is a normal discharge or an abnormal discharge based on a result of the comparing the value of the high frequency component with the predetermined value; and
a discharge state assessor that determines whether the abnormal discharge is an abnormal non-immediate discharge or an abnormal immediate discharge based on the determination of the immediate-discharge determiner and the determination of the abnormal-discharge determiner; wherein
the discharge is determined as the normal discharge in response to the electric discharge machining system being in a first machining condition in which a discharge continuation time has a first intermediate value in an allowable setting range,
the discharge is determined as the abnormal immediate discharge in response to the electric discharge machining system being in a second machining condition in which the discharge continuation time has a second intermediate value in the allowable setting range and a suspension time is shorter than the discharge continuation time,
the discharge is determined as the abnormal non-immediate discharge in response to the electric discharge machining system being in a third machining condition in which the discharge continuation time is longer than the first and second intermediate values,
the suspension time in the first machining condition and the third machining condition is longer than the suspension time in the second machining condition, and
the electric discharge machining system further comprises a machining condition controller that extends the discharge continuation time in response to the discharge being determined as the normal charge and the non-immediate discharge.

9. The electric discharge machining system according to claim 1, wherein a display device is provided to indicate a state of the discharge determined by the discharge state assessor.

10. The electric discharge machining system according to claim 6, wherein a display device is provided to indicate a state of the discharge determined by the discharge state assessor.

11. The electric discharge machining system according to claim 7, wherein a display device is provided to indicate a state of the discharge determined by the discharge state assessor.

12. The electric discharge machining system according to claim 8, wherein a display device is provided to indicate a state of the discharge determined by the discharge state assessor.

13. The electric discharge machining system according to claim 1, wherein the suspension time in the first machining condition and the third machining condition is equal to the discharge continuation time.

\* \* \* \* \*